(12) United States Patent
Hsieh et al.

(10) Patent No.: US 10,846,018 B2
(45) Date of Patent: Nov. 24, 2020

(54) MEMORY DEVICE, MEMORY CONTROLLER AND ASSOCIATED MEMORY SYSTEM OPERATED ACCORDING TO SELECTED CLOCK SIGNALS

(71) Applicant: MEDIATEK INC., Hsin-Chu (TW)

(72) Inventors: Bo-Wei Hsieh, Hsinchu (TW); Chia-Yu Chan, Kaohsiung (TW); Shang-Pin Chen, Zhubei (TW)

(73) Assignee: MEDIATEK INC., Hsin-Chu (TW)

(*) Notice: Subject to any disclaimer, the term of this patent is extended or adjusted under 35 U.S.C. 154(b) by 32 days.

(21) Appl. No.: 15/935,200

(22) Filed: Mar. 26, 2018

(65) Prior Publication Data
US 2018/0293026 A1    Oct. 11, 2018

Related U.S. Application Data

(60) Provisional application No. 62/481,713, filed on Apr. 5, 2017.

(51) Int. Cl.
| | | |
|---|---|---|
| *G06F 12/00* | (2006.01) | |
| *G06F 3/06* | (2006.01) | |
| *G06F 13/16* | (2006.01) | |

(52) U.S. Cl.
CPC .......... *G06F 3/0659* (2013.01); *G06F 3/0611* (2013.01); *G06F 3/0673* (2013.01); *G06F 13/16* (2013.01)

(58) Field of Classification Search
CPC .... G06F 3/0659; G06F 3/0673; G06F 3/0611; G06F 13/16; G11C 7/222
(Continued)

(56) References Cited

U.S. PATENT DOCUMENTS 6,812,734 B1 * 11/2004 Shumarayev ....... H04L 25/0278
326/26
8,296,526 B2 * 10/2012 O'Brien .............. G06F 13/1652
711/147
(Continued)

FOREIGN PATENT DOCUMENTS

| CN | 103279438 A | 9/2013 |
| CN | 104981872 A | 10/2015 |

(Continued)

OTHER PUBLICATIONS

TIPO Office Action dated Nov. 27, 2018 in Taiwan application (No. 107111537).

*Primary Examiner* — Mardochee Chery
(74) *Attorney, Agent, or Firm* — Winston Hsu

(57) ABSTRACT

A memory system includes a memory controller, a first memory device and a second memory device. The memory controller issues a first clock signal and a second clock signal. The memory controller transmits or receives a data signal. The first memory device receives the first clock signal and the second clock signal. The second memory device receives the first dock signal and the second clock signal. If a first mode register of the first memory device is in a first single-ended mode and a second mode register of the second memory device is in a second single-ended mode, the first memory device transmits or receives the data signal according to the first dock signal, and the second memory device transmits or receives the data signal according to the second clock signal.

18 Claims, 5 Drawing Sheets

(58) Field of Classification Search
USPC .......................................................... 711/105
See application file for complete search history.

(56) References Cited

U.S. PATENT DOCUMENTS

| | | | |
|---|---|---|---|
| 10,140,028 B2 | 11/2018 | Gillingham et al. | |
| 10,169,262 B2 | 1/2019 | West et al. | |
| 2011/0264851 A1 | 10/2011 | Jeon | |
| 2013/0099830 A1* | 4/2013 | Oh .................. | H03K 19/01750 |
| | | | 327/108 |
| 2015/0364176 A1* | 12/2015 | Lee ...................... | G06F 11/079 |
| | | | 714/57 |

FOREIGN PATENT DOCUMENTS

| | | |
|---|---|---|
| CN | 106415729 A | 2/2017 |
| TW | 200901194 | 1/2009 |
| TW | 201706990 A | 2/2017 |

* cited by examiner

MEMORY DEVICE, MEMORY CONTROLLER AND ASSOCIATED MEMORY SYSTEM OPERATED ACCORDING TO SELECTED CLOCK SIGNALS

This application claims the benefit of U.S. provisional application Ser. No. 62/481,713, filed Apr. 5, 2017, the subject matter of which is incorporated herein by reference.

FIELD OF THE INVENTION

The invention relates to a memory device, a memory controller and a memory system, and more particularly to a memory device, a memory controller and a memory system that are operated according to the selected dock signals.

BACKGROUND OF THE INVENTION

Generally, a memory system comprises a memory controller and a memory device. The memory controller is connected with the memory device. The memory controller can write data into the memory device or read data from the memory device. For example, a double data rate DRAM (also abbreviated as DDR DRAM) is one of the common memory devices.

FIG. 1 illustrates a conventional memory system. As shown in FIG. 1, the memory system 100 comprises a memory controller 110 and two memory devices 120 and 130. Moreover, plural pins of the memory controller 110 are connected with corresponding pins of the memory devices 120 and 130 in order to transmit various signals. For example, the memory devices 120 and 130 are double data rate DRAMs.

As shown in FIG. 1, the signals of the memory controller 110 comprises two clock signals CK1, CK2, two chip select signals CS0, CS1, (m+1) command signals CMD[m:0] and (n+1) data signals DQ[n:0]. The chip select signal CS0 is transmitted to the memory device 120. The chip select signal CS1 is transmitted to the memory device 130.

The clock signals CK1, CK2, the command signals CMD[m:0] and data signals DQ[n:0] are sharing signals. That is, both of the memory devices 120 and 130 receive the clock signals CK1, CK2 and the command signals CMD[m:0], and both of the memory devices 120 and 130 receive or transmit the data signals DQ[n:0]. Moreover, the command signals CMD[m:0] include column address signals.

In the conventional memory system 100, the clock signals CK1 and CK2 are formed as a differential clock signal pair. That is, the phase difference between the clock signals CK1 and CK2 from the memory controller 110 is 180 degrees.

The memory controller 110 transmits the chip select signals CS0, CS1, the command signals CMD[m:0] and the data signals DQ[n:0] according to the differential clock signal pair. Similarly, the memory devices 120 and 130 receive or transmit the data signals DQ[n:0] according to the differential dock signal pair.

When the chip select signal CS0 is activated by the memory controller 110, the memory device 130 is disabled and the memory device 120 is enabled according to the differential clock signal pair. For example, in case that the command signals CMD[m:0] are write commands, the memory device 120 acquires the write data from the memory controller 110 through the data signals DQ[n:0]. Moreover, the write data are stored into the memory device 120. In case that the command signals CMD[m:0] are read commands, the memory device 120 generates read data. In addition, the read data are transmitted to the memory controller 110 through the data signals DQ[n:0].

When the chip select signal CS1 is activated by the memory controller 110, the memory device 120 is disabled and the memory device 130 is enabled according to the differential dock signal pair. The operations of the memory controller 110 and the memory device 130 are similar to those mentioned above, and are not redundantly described herein.

As mentioned above, the dock signals CK1 and CK2 generated by the memory controller 110 of the conventional memory system 100 are formed as the differential clock signal pair, and both of the memory devices 120 and 130 are operated according to the differential dock signal pair.

SUMMARY OF THE INVENTION

An embodiment of the invention provides a memory system. The memory system includes a memory controller, a first memory device and a second memory device. The memory controller issues a first clock signal and a second clock signal. The memory controller selectively transmits or receives a data signal. The first memory device receives the first clock signal and the second clock signal. The first memory device selectively transmits or receives the data signal. The second memory device receives the first clock signal and the second clock signal. The second memory device selectively transmits or receives the data signal. If a first mode register of the first memory device is in a first single-ended mode and a second mode register of the second memory device is in a second single-ended mode, the first memory device transmits or receives the data signal according to the first clock signal, and the second memory device transmits or receives the data signal according to the second clock signal.

Another embodiment of the invention provides a memory device. The memory device is connected with a memory controller. The memory device includes a mode register. The memory device receives a first clock signal and a second clock signal from the memory controller. The memory device transmits or receives a data signal. If the mode register of the memory device is in a first single-ended mode, the first memory device transmits or receives the data signal according to the first clock signal. If the mode register of the memory device is in a second single-ended mode, the first memory device transmits or receives the data signal according to the second clock signal.

A further embodiment of the invention provides a memory controller. The memory controller is connected with a first memory device and a second memory device. The memory controller is configured to: issue a first clock signal to the first memory device and the second memory device; issue a second clock signal to the first memory device and the second memory device; and transceive a first data signal to the first memory device with reference to the first clock signal according to a first mode register of the first memory device and transceive a second data signal to the second memory device with reference to the second clock signal according to a second mode register of the second memory device.

The memory controller issues a first clock signal to the first memory device and the second memory device, issues a second clock signal to the first memory device and the second memory device, and transmits or receives a data signal. If a first mode register of the first memory device is in a first single-ended mode and a second mode register of the second memory device is in a second single-ended mode according to settings of the memory controller, the first memory device transmits or receives the data signal according to the first clock signal, and the second memory device transmits or receives the data signal according to the second clock signal.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 2:
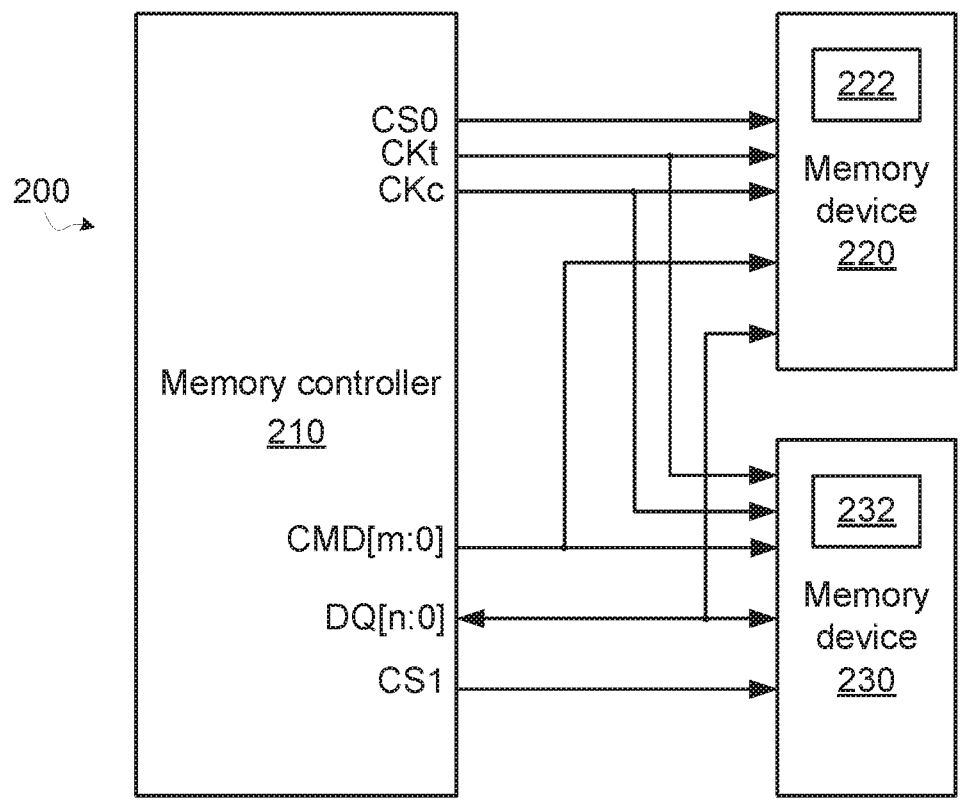
FIG. 2 schematically illustrates the architecture of a memory system according to a first embodiment of the invention.

FIG. 2 schematically illustrates the architecture of a memory system according to a first embodiment of the invention. As shown in FIG. 2, the memory system 200 comprises a memory controller 210 and two memory devices 220 and 230. Moreover, plural pins of the memory controller 210 are connected with corresponding pins of the memory devices 220 and 230 in order to transmit various signals. For example, the memory devices 220 and 230 are double data rate DRAMs.

As shown in FIG. 2, the signals of the memory controller 210 comprises two clock signals CKt, CKc, two chip select signals CS0, CS1, (m+1) command signals CMD[m:0] and (n+1) data signals DQ[n:0]. The chip select signal CS0 is transmitted to the memory device 220. The chip select signal CS1 is transmitted to the memory device 230.

The clock signals CKt, CKc, the command signals CMD[m:0] and data signals DQ[n:0] are sharing signals. That is, both of the memory devices 220 and 230 receive the clock signals CKt, CKc and the command signals CMD[m:0], and both of the memory devices 220 and 230 receive or transmit the data signals DQ[n:0]. Moreover, the command signals CMD[m:0] include column address signals.

In this embodiment, the memory device 220 comprises a mode register 222, and the memory device 230 comprises a mode register 232. By setting the two mode registers 222 and 232 through the memory controller 210, the memory devices 220 and 230 can be operated according to different dock signals. The operating principles will be described in more details as follows.

In an embodiment, the two mode registers 222 and 232 are selectively in a differential mode, a first single-ended mode or a second single-ended mode according to the settings of the memory controller 210.

Figure 1:
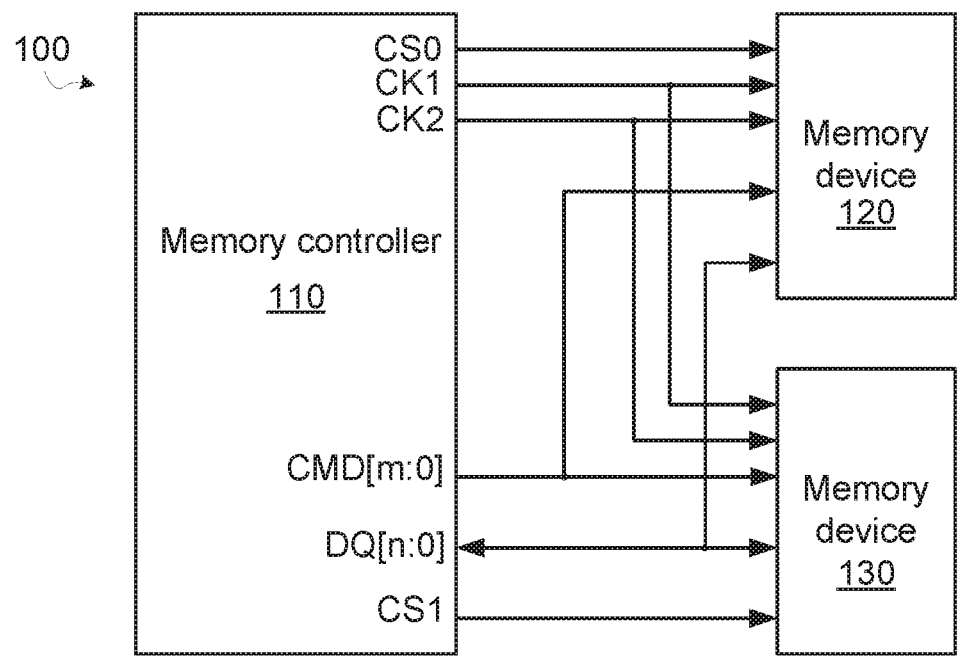
FIG. 1 (prior art) schematically illustrates the architecture of a conventional memory system.

In case that the two mode registers 222 and 232 are in the differential mode according to the settings of the memory controller 210, the dock signals CKt and CKc from the memory controller 210 have a 180-degree phase difference. That is, the dock signals CKt and CKc are formed as a differential clock signal pair. The memory devices 220 and 230 are operated according to the differential clock signal pair. In the differential mode, the operations of the memory system 200 are similar to those of FIG. 1, and are not redundantly described herein.

In case that the mode register 222 is in the first single-ended mode and the mode register 232 is in the second single-ended mode according to the settings of the memory controller 210, the dock signals CKt and CKc from the memory controller 210 are independent from each other. That is, the dock signals CKt and CKc may have different operating frequencies and different duty cycles. In addition, there is no specified phase difference relationship between the clock signals CKt and CKc. Alternatively, the clock signals CKt and CKc have the same operating frequency, but the phase difference between the clock signals CKt and CKc is not 180 degrees.

Under control of the memory controller 210, the memory device 220 is operated according to the single-ended clock signal CKt. Under control of the memory controller 210, the memory device 230 is operated according to the single-ended clock signal CKc.

When the chip select signal CS0 is activated by the memory controller 210 according to the operating frequency of the single-ended clock signal CKt, the memory device 230 is disabled and the memory device 220 is enabled. For example, in case that the command signals CMD[m:0] are write commands, the memory device 220 latches the data signals DQ[n:0] according to the operating frequency of the single-ended clock signal CKt and thus acquires the write data from the memory controller 210. Moreover, the write data are stored into the memory device 220. In case that the command signals CMD[m:0] are read commands, the memory device 220 generates read data. Moreover, the read data are transmitted to the memory controller 210 through the data signals DQ[n:0] according to the operating frequency of the single-ended clock signal CKt. That means the memory controller 210 is able to transceiver data signals DQ[n:0] to the memory device 220 with reference to the single-ended clock signal CKt according to a mode register 222 of the memory device 220.

When the chip select signal CS1 is activated by the memory controller 210 according to the operating frequency of the single-ended clock signal CKc, the memory device 220 is disabled and the memory device 230 is enabled. For example, in case that the command signals CMD[m:0] are write commands, the memory device 230 latches the data signals DQ[n:0] according to the operating frequency of the single-ended clock signal CKc and thus acquires the write data from the memory controller 210. Moreover, the write data are stored into the memory device 230. In case that the command signals CMD[m:0] are read commands, the memory device 230 generates read data. Moreover, the read data are transmitted to the memory controller 210 through the data signals DQ[n:0] according to the operating frequency of the single-ended clock signal CKc.

In case that the mode register 222 is in the second single-ended mode and the mode register 232 is in the first single-ended mode according to the settings of the memory controller 210, the memory device 220 is operated according to the single-ended clock signal CKc and the memory device 230 is operated according to the single-ended clock signal CKt. The operations are similar to those mentioned above, and are not redundantly described herein.

From the above descriptions, the two memory devices 220 and 230 of the memory system 200 are operated according to respective clock signals. Since the operating frequencies of the two clock signals are different and there is no phase difference relationship between the two clock signals, the accessing speeds of the memory devices 220 and 230 are different.

Figure 3:
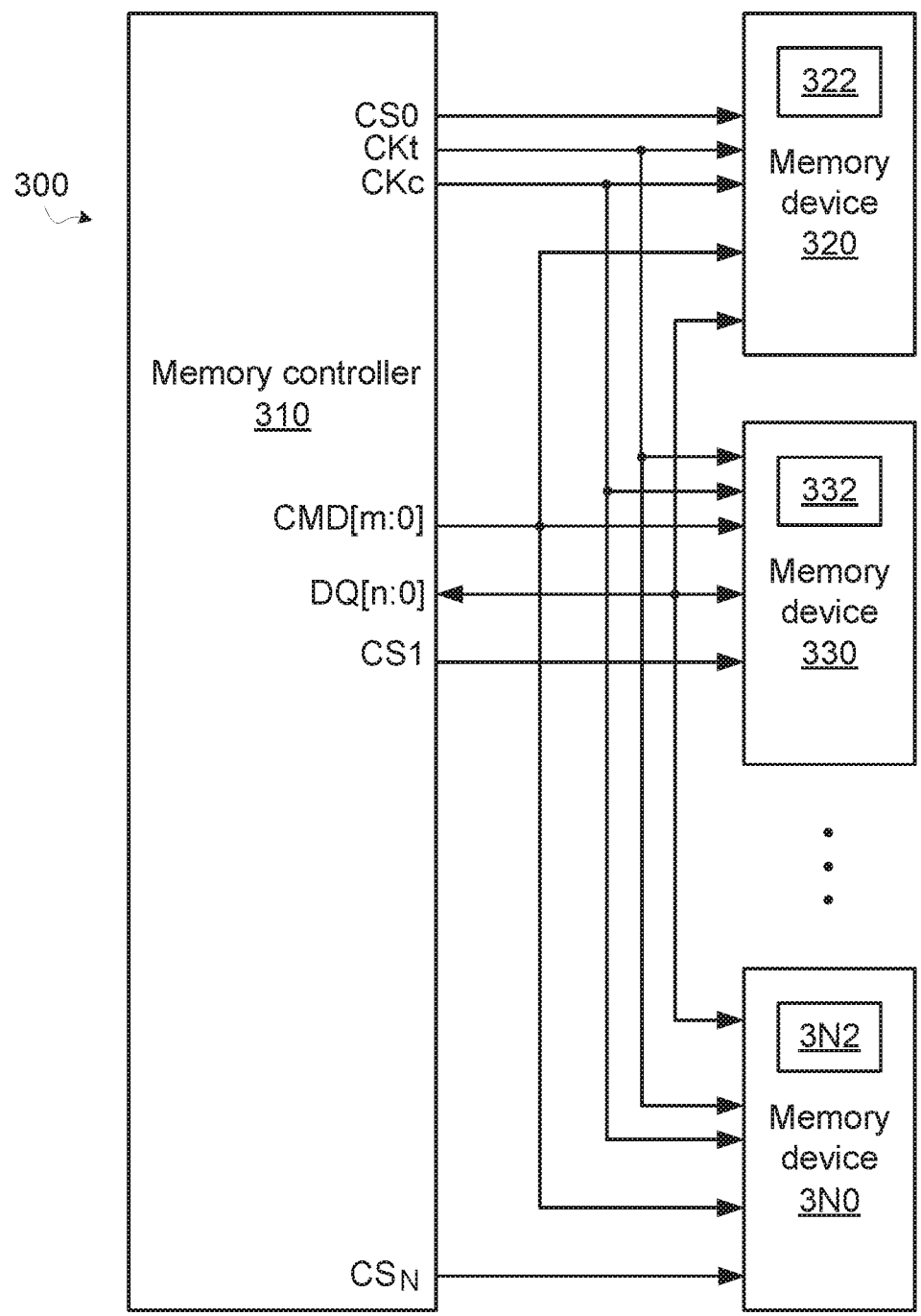
FIG. 3 schematically illustrates the architecture of a memory system according to a second embodiment of the invention.

FIG. 3 schematically illustrates the architecture of a memory system according to a second embodiment of the invention. As shown in FIG. 3, the memory system 300 comprises a memory controller 310 and plural memory devices 320~3N0. Moreover, plural pins of the memory controller 310 are connected with corresponding pins of the memory devices 320~3N0 in order to transmit various signals. For example, the memory devices 320 and 3N0 are double data rate DRAMs.

As shown in FIG. 3, the signals of the memory controller 310 comprises two clock signals CKt, CKc, (N+1) chip select signals CS0~CSN, (m+1) command signals CMD[m:0] and (n+1) data signals DQ[n:0]. The chip select signal CS0 is transmitted to the memory device 320. The chip select signal CS1 is transmitted to the memory device 330. The chip select signal CSN is transmitted to the memory device 3N0. The rest may be deduced by analogy.

The clock signals CKt, CKc, the command signals CMD[m:0] and data signals DQ[n:0] are sharing signals. That is, the memory devices 320~3N0 receive the dock signals CKt, CKc and the command signals CMD[m:0], and the memory devices 320~3N0 receive or transmit the data signals DQ[n:0]. Moreover, the command signals CMD[m:0] include column address signals.

In this embodiment, the memory devices 320~3N0 comprise mode registers 322~3N2, respectively. By setting these mode registers 322~3N2 through the memory controller 310, the memory devices 320~3N0 can be operated according to different clock signals. The operating principles will be described in more details as follows.

In case that the mode registers 322~3N2 are in the differential mode according to the settings of the memory controller 310, the clock signals CKt and CKc from the memory controller 310 have a 180-degree phase difference. That is, the clock signals CKt and CKc are formed as a differential clock signal pair. The memory devices 320~3N0 are operated according to the differential clock signal pair.

In another embodiment, first-portion mode registers of the mode registers 322~3N2 are in the first single-ended mode and second-portion mode registers of the mode registers 322~3N2 are in the second single-ended mode according to the settings of the memory controller 310.

Under this circumstance, the clock signals CKt and CKc from the memory controller 310 may have different operating frequencies and different duty cycles. In addition, there is no specified phase difference relationship between the clock signals CKt and CKc.

Under control of the memory controller 310, first-portion memory devices of the memory devices 320~3N0 are operated according to the single-ended clock signal CKt. Under control of the memory controller 310, second-portion memory devices of the memory devices 320~3N0 are operated according to the single-ended clock signal CKc. The operating principles of this embodiment are similar to those of the first embodiment, and are not redundantly described herein.

Figure 4:
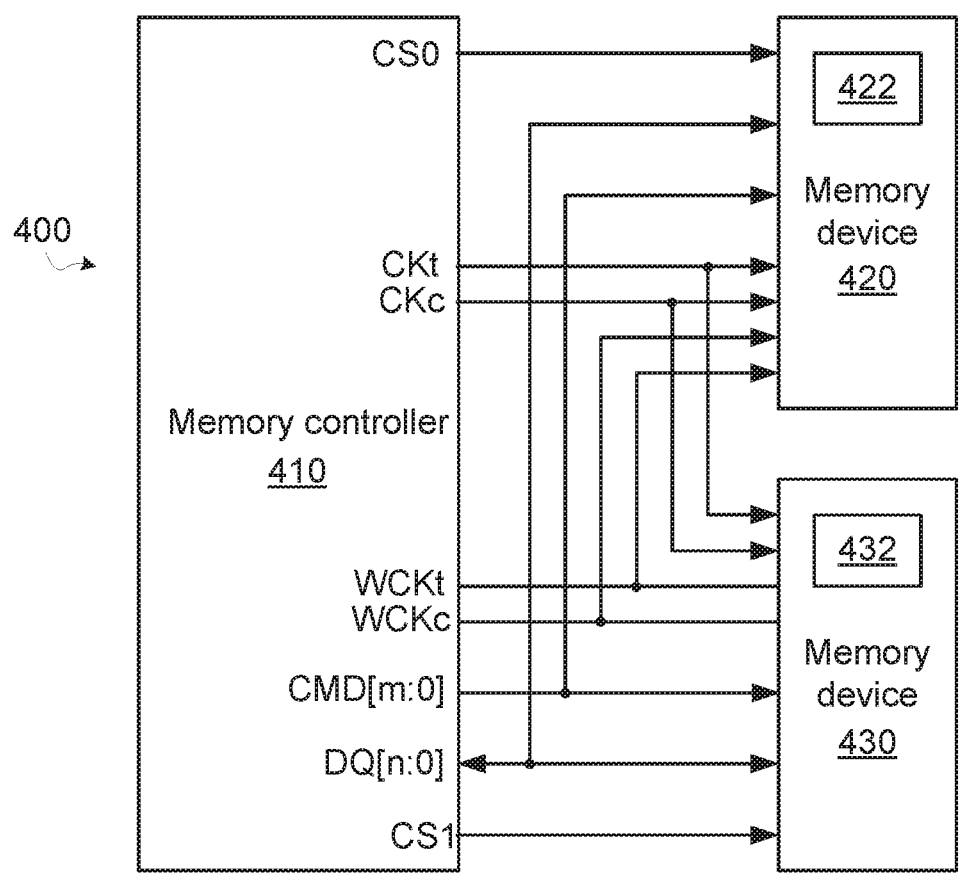
FIG. 4 schematically illustrates the architecture of a memory system according to a third embodiment of the invention.

FIG. 4 schematically illustrates the architecture of a memory system according to a third embodiment of the invention. As shown in FIG. 4, the memory system 400 comprises a memory controller 410 and two memory devices 420 and 430. Moreover, plural pins of the memory controller 410 are connected with corresponding pins of the memory devices 420 and 430 in order to transmit various signals. For example, the memory devices 420 and 430 are double data rate DRAMs.

As shown in FIG. 4, the signals of the memory controller 410 comprises two clock signals CKt, CKc, two clock signals WCKt, WCKc, two chip select signals CS0, CS1, (m+1) command signals CMD[m:0] and (n+1) data signals DQ[n:0]. The chip select signal CS0 is transmitted to the memory device 420. The chip select signal CS1 is transmitted to the memory device 430.

The clock signals CKt, CKc, the clock signals WCKt, WCKc, the command signals CMD[m:0] and data signals DQ[n:0] are sharing signals. That is, both of the memory devices 420 and 430 receive the clock signals CKt, CKc, the clock signals WCKt, WCKc, and the command signals CMD[m:0], and both of the memory devices 420 and 430 receive or transmit the data signals DQ[n:0]. Moreover, the command signals CMD[m:0] include column address signals.

In this embodiment, the memory system 400 has a higher data transmission rate. In accordance with a feature of this embodiment, the memory controller 410 transmits the command signals CMD[m:0] according to the clock signals CKt and CKc, and the memory controller 401 receives or transmits the data signals DQ[n:0] according to the clock signals WCKt and WCKc. The clock signals CKt and CKc are formed as a first differential clock signal pair. Moreover, the operating frequencies of the clock signals WCKt and WCKc are higher than the operating frequencies of the clock signals CKt and CKc.

In this embodiment, the memory device 420 comprises a mode register 422, and the memory device 430 comprises a mode register 432. By setting the two mode registers 422 and 432 through the memory controller 410, the memory devices 420 and 430 receive or transmit the data signals DQ[n:0] according to different clock signals. The operating principles will be described in more details as follows.

In an embodiment, the two mode registers 422 and 432 are selectively in a differential mode, a first single-ended mode or a second single-ended mode according to the settings of the memory controller 410.

In case that the two mode registers 422 and 432 are in the differential mode according to the settings of the memory controller 410, the dock signals WCKt and WCKc from the memory controller 410 have a 180-degree phase difference. That is, the clock signals WCKt and WCKc are formed as a second differential clock signal pair. The memory devices 420 and 430 are operated according to the first differential clock signal pair and the second differential clock signal.

That is, the memory controller 410 transmits the chip select signals CS0, CS1 and the command signals CMD[m:0] according to the first differential clock signal pair, and the memory controller 401 transmits the data signals DQ[n:0] according to the second differential clock signal. Moreover, the memory devices 420 and 430 receive or transmit the data signal DQ[n:0] according to the second differential clock signal.

When the chip select signal CS0 is asserted by the memory controller 410, the memory device 430 is disabled and the memory device 420 is enabled. For example, in case that the command signals CMD[m:0] are write commands, the memory device 420 latches the data signals DQ[n:0] according to the second differential clock signal pair and thus acquires the write data from the memory controller 410. Moreover, the write data are stored into the memory device 420. In case that the command signals CMD[m:0] are read commands, the memory device 420 generates read data. Moreover, the read data are transmitted to the memory controller 410 through the data signals DQ[n:0] according to the second differential clock signal pair.

When the chip select signal CS1 is asserted by the memory controller 410, the memory device 420 is disabled and the memory device 430 is enabled. The operations are similar to those mentioned above, and are not redundantly described herein.

In case that the mode register 422 is in the first single-ended mode and the mode register 432 is in the second single-ended mode according to the settings of the memory controller 410, the memory controller 410 transmits the chip select signals CS0, CS1 and the command signals CMD[m:0] according to the first differential dock signal pair. Moreover, the clock signals WCKt and WCKc from the memory controller 410 are independent from each other. That is, the dock signals WCKt and WCKc may have different operating frequencies and different duty cycles. In addition, there is no specified phase difference relationship between the clock signals WCKt and WCKc. Alternatively, the clock signals WCKt and WCKc have the same operating frequency, but the phase difference between the dock signals WCKt and WCKc is not 180 degrees.

Under control of the memory controller 410, the memory device 420 is operated according to the single-ended dock signal WCKt in order to output or receive the data signals DQ[n:0]. Under control of the memory controller 410, the memory device 430 is operated according to the single-ended clock signal WCKc in order to output or receive the data signals DQ[n:0].

When the chip select signal CS0 is asserted by the memory controller 410 according to the operating frequency of the first differential clock signal pair, the memory device 430 is disabled and the memory device 420 is enabled. For example, in case that the command signals CMD[m:0] are write commands, the memory device 420 latches the data signals DQ[n:0] according to the operating frequency of the single-ended clock signal WCKt and thus acquires the write data from the memory controller 410. Moreover, the write data are stored into the memory device 420. In case that the command signals CMD[m:0] are read commands, the memory device 420 generates read data. Moreover, the read data are transmitted to the memory controller 410 through the data signals DQ[n:0] according to the operating frequency of the single-ended clock signal WCKt.

When the chip select signal CS1 is asserted by the memory controller 410 according to the operating frequency of the first differential clock signal pair, the memory device 420 is disabled and the memory device 430 is enabled. For example, in case that the command signals CMD[m:0] are write commands, the memory device 430 latches the data signals DQ[n:0] according to the operating frequency of the single-ended clock signal WCKc and thus acquires the write data from the memory controller 410. Moreover, the write data are stored into the memory device 430. In case that the command signals CMD[m:0] are read commands, the memory device 430 generates read data. Moreover, the read data are transmitted to the memory controller 410 through the data signals DQ[n:0] according to the operating frequency of the single-ended clock signal WCKc.

In case that the mode register 422 is in the second single-ended mode and the mode register 432 is in the first single-ended mode according to the settings of the memory controller 410, the memory device 420 is operated according to the first differential clock signal pair and the single-ended clock signal WCKc, and the memory device 430 is operated according to the first differential clock signal pair and the single-ended clock signal WCKt. The operations are similar to those mentioned above, and are not redundantly described herein.

Figure 5:
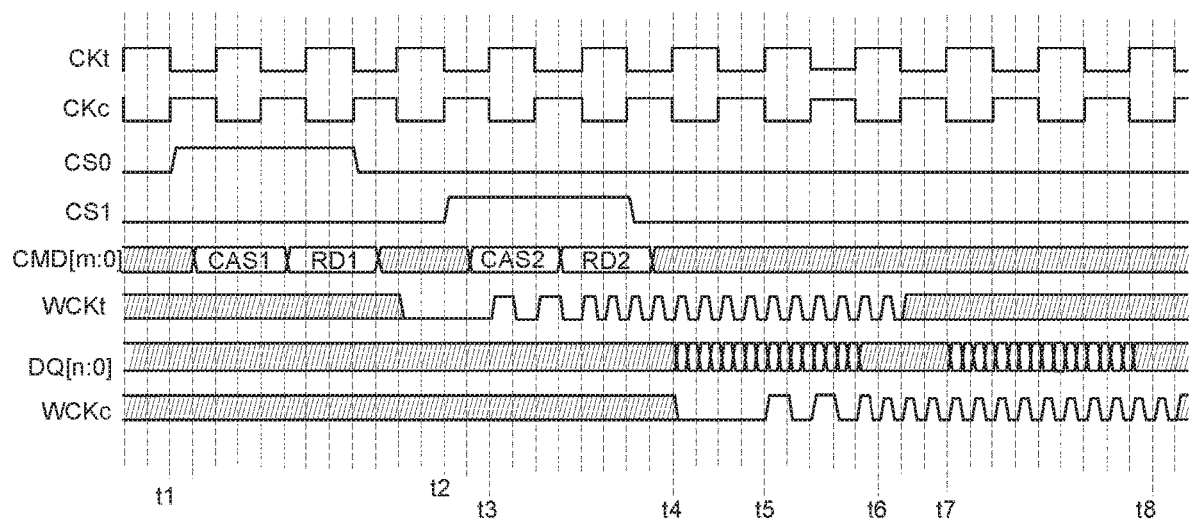
FIG. 5 is an exemplary timing waveform diagram illustrating associated signal processed by the memory system according to the third embodiment of the invention.

FIG. 5 is an exemplary timing waveform diagram illustrating associated signal processed by the memory system according to the third embodiment of the invention. For example, the mode register 422 is in the first single-ended mode, and the mode register 432 is in the second single-ended mode.

At the time point t1, the memory controller 410 activates the chip select signal CS0 according to the operating frequency of the first differential clock signal pair. While the chip select signal CS0 is activated, the memory device 420 receives the command signals CMD[m:0] from the memory controller 410. For example, the command signals contain a column address signal CAS1 and a read command RD1.

At the time point t2, the memory controller 410 activates the chip select signal CS1 according to the operating frequency of the first differential clock signal pair. While the chip select signal CS1 is activated, the memory device 430 receives the command signals CMD[m:0] from the memory controller 410. For example, the command signals contain a column address signal CAS2 and a read command RD2.

At the time point t3, the memory device 420 has prepared the read data. Meanwhile, the single-ended clock signal WCKt is activated. Then, in the time interval between the time point t4 and the time point t6, the memory device 420 transmits the read data to the memory controller 410 at a double data rate through the data signals DQ[n:0] according to the single-ended clock signal WCKt.

At the time point t5, the memory device 430 has prepared the read data. Meanwhile, the single-ended clock signal WCKc is activated. Then, in the time interval between the time point t7 and the time point t8, the memory device 430 transmits the read data to the memory controller 410 at a double data rate through the data signals DQ[n:0] according to the single-ended clock signal WCKc.

Figure 6:
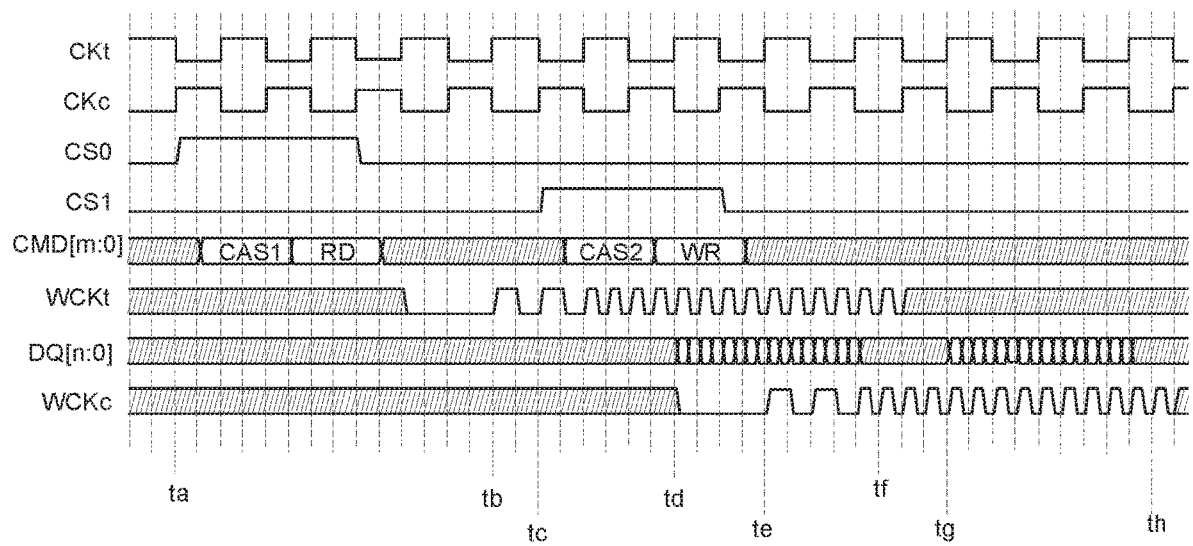
FIG. 6 is another exemplary timing waveform diagram illustrating associated signal processed by the memory system according to the third embodiment of the invention.

FIG. 6 is another exemplary timing waveform diagram illustrating associated signal processed by the memory system according to the third embodiment of the invention. For example, the mode register 422 is in the first single-ended mode, and the mode register 432 is in the second single-ended mode.

At the time point ta, the memory controller 410 activates the chip select signal CS0 according to the operating frequency of the first differential clock signal pair. While the chip select signal CS0 is activated, the memory device 420 receives the command signals CMD[m:0] from the memory controller 410. For example, the command signals contain a column address signal CAS1 and a read command RD.

At the time point tb, the memory device 420 has prepared the read data. Meanwhile, the single-ended clock signal WCKt is activated. Then, in the time interval between the time point td and the time point if, the memory device 420 transmits the read data to the memory controller 410 at a double data rate through the data signals DQ[n:0] according to the single-ended clock signal WCKt.

At the time point tc, the memory controller 410 activates the chip select signal CS1 according to the operating frequency of the first differential clock signal pair. While the chip select signal CS1 is activated, the memory device 430 receives the command signals CMD[m:0] from the memory controller 410. For example, the command signals contain a column address signal CAS2 and a write command WR.

At the time point te, the memory device 430 has prepared the write data. Meanwhile, the single-ended clock signal WCKc is activated. Then, in the time interval between the time point tg and the time point th, the memory device 430 latches the data signals DQ[n:0] according to the raising and falling edges of the single-ended clock signal WCKc and acquires the write data from the memory controller 41. Moreover, the write data is stored in the memory device 430.

From the above descriptions, the two memory devices 420 and 430 of the memory system 400 are operated according to respective clock signals. Since the operating frequencies of the two clock signals are different and there is no phase difference relationship between the two clock signals, the accessing speeds of the memory devices 420 and 430 are different.

In the embodiment of FIG. 4, the memory system 400 of the third embodiment comprises two memory devices 420 and 430. It is noted that the number of the memory devices in the memory system of the invention is not restricted. That is, in the memory system of another embodiment, the memory controller is connected with more than two memory devices.

It is noted that numerous modifications and alterations may be made while retaining the teachings of the invention. For example, the settings of the mode registers 422 and 432 of the memory devices 420 and 430 may be changed. For example, the memory device 420 receives the chip select signal CS0 and the common signals CMD[m:0] according to the single-ended clock signal WCKt, and the memory device 430 receives the chip select signal CS1 and the common signals CMD[m:0] according to the single-ended clock signal WCKc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A memory system, comprising:
   a memory controller issuing a first chip select signal, a second chip select signal, a command signal, a first clock signal and a second clock signal, wherein the memory controller selectively transmits or receives a data signal;
   a first memory device receiving the first chip select signal, the command signal, the first clock signal and the second clock signal, wherein the first memory device selectively transmits or receives the data signal; and
   a second memory device receiving the second chip select signal, the command signal, the first clock signal and the second clock signal, wherein the second memory device selectively transmits or receives the data signal,
   wherein if a first mode register of the first memory device is in a first single-ended mode and a second mode register of the second memory device is in a second single-ended mode, the memory controller transmits the command signal to the first memory device according to the first clock signal without referring to the second clock signal, the memory controller transmits the command signal to the second memory device according to the second clock signal without referring to the first clock signal, the first memory device transmits or receives the data signal according to the first clock signal without referring to the second clock signal, and the second memory device transmits or receives the data signal according to the second clock signal without referring to the first clock signal;
   wherein if the first mode register and the second mode register are in a differential mode, the first clock signal and the second clock signal are formed as a differential clock signal pair, and the first memory device and the second memory device transmit or receive the data signal according to the differential clock signal pair comprising both of the first clock signal and the second clock signal.

2. The memory system as claimed in claim 1, wherein if the first mode register of the first memory device is in the first single-ended mode and the second mode register of the second memory device is in the second single-ended mode, the memory controller transmits the first chip select signal and the command signal to the first memory device according to the first clock signal, the memory controller transmits the second chip select signal and the command signal to the second memory device according to the second clock signal.

3. The memory system as claimed in claim 1, wherein if the first mode register of the first memory device is in the first single-ended mode and the second mode register of the second memory device is in the second single-ended mode, there is no specified phase difference relationship between the first clock signal and the second clock signal; and if the first mode register and the second mode register are in the differential mode, the first clock signal and the second clock signal have a 180-degree phase difference.

4. A memory system, comprising
   a memory controller issuing a first chip select signal, a second chip select signal, a command signal, a first clock signal, a second clock signal, a third clock signal and a fourth clock signal, wherein the memory controller selectively transmits or receives a data signal;
   a first memory device receiving the first chip select signal, the command signal, the first clock signal, the second clock signal, the third clock signal and the fourth clock signal, wherein the first memory device selectively transmits or receives the data signal; and
   a second memory device receiving the second chip select signal, the command signal, the first clock signal, the second clock signal, the third clock signal and the fourth clock signal, wherein the second memory device selectively transmits or receives the data signal,
   wherein if the first mode register is in the first single-ended mode and the second mode register is in the second single-ended mode, the first memory device transmits or receives the data signal according to the first clock signal without referring to the second clock signal, and the second memory device transmits or receives the data signal according to the second clock signal without referring to the first clock signal;
   wherein if the first mode register and the second mode register are in a differential mode, the third clock signal and the fourth clock signal are formed as a differential clock signal pair, wherein the memory controller issues the first chip select signal and the command signal to the first memory device according to the differential clock signal pair, and the memory controller issues the second chip select signal and the command signal to the second memory device according to the differential clock signal pair.

5. The memory system as claimed in claim 4, wherein if the first mode register is in the first single-ended mode and the second mode register is in the second single-ended mode, the memory controller transmits the first chip select signal and the command signal to the first memory device according to the third clock signal, the memory controller transmits the second chip select signal and the command signal to the second memory device according to the fourth clock signal.

6. The memory system as claimed in claim 4, wherein operating frequencies of the first clock signal and the second clock signal are greater than operating frequencies of the third clock signal and the fourth clock signal.

7. The memory system as claimed in claim 4, wherein if the first mode register of the first memory device is in the first single-ended mode and the second mode register of the second memory device is in the second single-ended mode, there is no specified phase difference relationship between the first clock signal and the second clock signal; and if the first mode register and the second mode register are in the differential mode, the first clock signal and the second clock signal have a 180-degree phase difference.

8. A memory device connected with a memory controller, the memory device comprising a mode register, wherein the memory device receives a first clock signal and a second clock signal from the memory controller, and the memory device transmits or receives a data signal, wherein if the mode register of the memory device is in a first single-ended mode, the memory device transmits or receives the data signal according to the first clock signal, wherein if the mode register of the memory device is in a second single-ended mode, the memory device transmits or receives the data signal according to the second clock signal,
wherein the memory controller further issues a chip select signal and a command signal to the memory device, wherein if the mode register is in the first single-ended mode, the memory controller transmits both of the first clock signal and the second clock signal to the memory device, but the memory controller transmits the command signal to the memory device according to the first clock signal without referring to the second clock signal, and wherein if the mode register is in the second single-ended mode, the memory controller transmits both of the first clock signal and the second clock signal to the memory device, but the memory controller transmits the command signal to the memory device according to the second clock signal without referring to the first clock signal;
wherein if the mode register is in a differential mode, the first clock signal and the second clock signal are formed as a differential clock signal pair, and the memory device transmits or receives the data signal according to the differential clock signal pair.

9. The memory device as claimed in claim 8, wherein if the mode register is in the first single-ended mode, the memory controller transmits the chip select signal and the command signal to the memory device according to the first clock signal, and wherein if the mode register is in the second single-ended mode, the memory controller transmits the chip select signal and the command signal to the memory device according to the second clock signal.

10. The memory device as claimed in claim 8, wherein if the first mode register of the first memory device is in the first single-ended mode and the second mode register of the second memory device is in the second single-ended mode, there is no specified phase difference relationship between the first clock signal and the second clock signal; and if the first mode register and the second mode register are in the differential mode, the first clock signal and the second clock signal have a 180-degree phase difference.

11. A memory device connected with a memory controller, the memory device comprising a mode register, wherein the memory device receives a first clock signal, a second clock signal, a third clock signal and a fourth clock signal from the memory controller, and the memory device transmits or receives a data signal, wherein if the mode register of the memory device is in a first single-ended mode, the memory device transmits or receives the data signal according to the first clock signal, and wherein if the mode register of the memory device is in a second single-ended mode, the memory device transmits or receives the data signal according to the second clock signal;
wherein the memory controller further issues a chip select signal to the memory device and issues a command signal to the memory device, wherein if the mode register is in the first single-ended mode, the memory controller transmits the command signal to the memory device according to the third clock signal without referring to the fourth clock signal, and wherein if the mode register is in the second single-ended mode, the memory controller transmits the command signal to the memory device according to the fourth clock signal without referring to the three clock signal;
wherein if the mode register is in a differential mode, the third clock signal and the fourth clock signal are formed as a differential clock signal pair, wherein the memory controller issues the chip select signal and the command signal to the memory device according to the differential clock signal pair.

12. The memory device as claimed in claim 11, wherein if the mode register is in the first single-ended mode, the memory controller transmits the chip select signal and the command signal to the memory device according to the third clock signal, and wherein if the mode register is in the second single-ended mode, the memory controller transmits the chip select signal and the command signal to the memory device according to the fourth clock signal.

13. A memory controller connected with a first memory device and a second memory device, the memory controller is configured to:
issue a first clock signal to the first memory device and the second memory device;
issue a second clock signal to the first memory device and the second memory device; and
transceive a first data signal to the first memory device with reference to the first clock signal according to a first mode register of the first memory device and transceive a second data signal to the second memory device with reference to the second clock signal according to a second mode register of the second memory device;
wherein the memory controller further issues a first chip select signal to the first memory device, issues a second chip select signal to the second memory device, and issues a command signal to the first memory device and the second memory device, and wherein if the first mode register is in the first single-ended mode and the second mode register is in the second single-ended mode, the memory controller transmits the command signal to the first memory device according to the first clock signal without referring to the second clock signal, and the memory controller transmits the command signal to the second memory device according to the second clock signal without referring to the first clock signal;

wherein if the first mode register and the second mode register are in a differential mode, the first clock signal and the second clock signal are formed as a differential clock signal pair, and the first memory device and the second memory device transmit or receive the data signal according to the differential clock signal pair.

14. The memory controller as claimed in claim 13, wherein if the first mode register is in the first single-ended mode and the second mode register is in the second single-ended mode, the memory controller transmits the first chip select signal and the command signal to the first memory device according to the first clock signal, and the memory controller transmits the second chip select signal and the command signal to the second memory device according to the second clock signal.

15. The memory controller as claimed in claim 13, wherein if the first mode register of the first memory device is in the first single-ended mode and the second mode register of the second memory device is in the second single-ended mode, there is no specified phase difference relationship between the first clock signal and the second clock signal; and if the first mode register and the second mode register are in the differential mode, the first clock signal and the second clock signal have a 180-degree phase difference.

16. A memory controller connected with a first memory device and a second memory device, the memory controller is configured to:
issue a first clock signal to the first memory device and the second memory device;
issue a second clock signal to the first memory device and the second memory device; and
transceive a first data signal to the first memory device with reference to the first clock signal according to a first mode register of the first memory device and transceive a second data signal to the second memory device with reference to the second clock signal according to a second mode register of the second memory device, wherein if the first mode register is in the first single-ended mode and the second mode register is in the second single-ended mode, transceiving the first data signal to the first memory device according to the first clock signal without referring to the second clock signal, and transceiving the second data signal to the second memory device according to the second clock signal without referring to the first clock signal;

wherein the memory controller further issues a first chip select signal to the first memory device, issues a second chip select signal to the second memory device, issues a command signal to the first memory device and the second memory device, issues a third clock signal to the first memory device and the second memory device, and issues a fourth clock signal to the first memory device and the second memory device;

wherein if the mode register is in a differential mode, the third clock signal and the fourth clock signal are formed as a differential clock signal pair, wherein the memory controller issues the first chip select signal and the command signal to the first memory device according to the differential clock signal pair, and the memory controller issues the second chip select signal and the command signal to the second memory device according to the differential clock signal pair.

17. The memory controller as claimed in claim 16, wherein if the first mode register is in the first single-ended mode and the second mode register is in the second single-ended mode, the memory controller transmits the first chip select signal and the command signal to the first memory device according to the third clock signal, and the memory controller transmits the second chip select signal and the command signal to the second memory device according to the fourth clock signal.

18. The memory controller as claimed in claim 16, wherein operating frequencies of the first clock signal and the second clock signal are greater than operating frequencies of the third clock signal and the fourth clock signal.

* * * * *